United States Patent
Srinivasan

(10) Patent No.: US 8,966,475 B2
(45) Date of Patent: Feb. 24, 2015

(54) WORKLOAD MANAGEMENT FOR HETEROGENEOUS HOSTS IN A COMPUTING SYSTEM ENVIRONMENT

(75) Inventor: Kattiganehalli Y. Srinivasan, Princeton Junction, NJ (US)

(73) Assignee: Novell, Inc., Provo, UT (US)

( * ) Notice: Subject to any disclaimer, the term of this patent is extended or adjusted under 35 U.S.C. 154(b) by 952 days.

(21) Appl. No.: 12/604,555

(22) Filed: Oct. 23, 2009

(65) Prior Publication Data
US 2011/0035754 A1 Feb. 10, 2011

Related U.S. Application Data

(60) Provisional application No. 61/232,568, filed on Aug. 10, 2009.

(51) Int. Cl.
G06F 9/455 (2006.01)
G06F 9/445 (2006.01)
G06F 9/48 (2006.01)
G06F 9/50 (2006.01)

(52) U.S. Cl.
CPC ............ *G06F 9/4856* (2013.01); *G06F 9/5077* (2013.01)
USPC ................................ 718/1; 717/174; 717/177

(58) Field of Classification Search
None
See application file for complete search history.

(56) References Cited

U.S. PATENT DOCUMENTS

| | | | |
|---|---|---|---|
| 2004/0117338 A1* | 6/2004 | Kennedy et al. | 707/1 |
| 2006/0277546 A1* | 12/2006 | Rothman et al. | 718/103 |
| 2007/0006218 A1* | 1/2007 | Vinberg et al. | 717/174 |
| 2007/0011272 A1 | 1/2007 | Bakke et al. | |
| 2008/0028399 A1 | 1/2008 | Gupta et al. | |
| 2008/0104586 A1* | 5/2008 | Thorton et al. | 718/1 |
| 2008/0123559 A1* | 5/2008 | Haviv et al. | 370/255 |
| 2008/0127227 A1 | 5/2008 | Aloni et al. | |
| 2008/0235804 A1 | 9/2008 | Bade et al. | |
| 2008/0263258 A1* | 10/2008 | Allwell et al. | 711/6 |
| 2009/0006534 A1* | 1/2009 | Fries et al. | 709/203 |
| 2009/0178033 A1 | 7/2009 | Challener et al. | |
| 2009/0222560 A1* | 9/2009 | Gopisetty et al. | 709/226 |
| 2010/0107113 A1* | 4/2010 | Innes et al. | 715/779 |
| 2010/0107155 A1* | 4/2010 | Banerjee et al. | 717/177 |
| 2010/0269109 A1* | 10/2010 | Cartales | 718/1 |
| 2013/0060919 A1* | 3/2013 | Khandekar et al. | 709/220 |

OTHER PUBLICATIONS wiki.xensource.com/xenwiki/XenWindowsGplPv; "XenWindowsGplPv" Copyright 2005-2009, Citrix Systems, Inc.; Printed Sep. 28, 2009; 2 Pages.
en.wikipedia.org/wiki/Xen; "Xen from Wikipedia, the free encyclopedia" Page was last modified on Sep. 22, 2009; Printed on Sep. 28, 2009; 7 Pages.

* cited by examiner

*Primary Examiner* — Abdullah Al Kawsar
(74) *Attorney, Agent, or Firm* — King & Schickli, PLLC

(57) ABSTRACT

Methods and apparatus involve managing workload migration to host devices in a data center having heterogeneously arranged computing platforms. Fully virtualized images include drivers compatible with varieties of host devices. The images also include an agent that detects a platform type of a specific host device upon deployment. If the specific host is a physical platform type, the agent provisions native drivers. If the specific host is a virtual platform type, the agent also detects a hypervisor. The agent then provisions front-end drivers that are most compatible with the detected hypervisor. Upon decommissioning of the image, the image is returned to its pristine state and saved for later re-use. In other embodiments, detection methods of the agent are disclosed as are computing systems, data centers, and computer program products, to name a few.

12 Claims, 4 Drawing Sheets

WORKLOAD MANAGEMENT FOR HETEROGENEOUS HOSTS IN A COMPUTING SYSTEM ENVIRONMENT

This utility application claims priority to U.S. Provisional Application Ser. No. 61/232,568, filed Aug. 10, 2009, having the same title. Its contents are expressly incorporated herein as if set forth herein.

FIELD OF THE INVENTION

Generally, the present invention relates to computing devices and environments involving computing workloads. Particularly, although not exclusively, it relates to managing workload migration amongst host devices in an environment of heterogeneously arranged computing platforms. Certain embodiments contemplate fully virtualized images having drivers compatible with varieties of hosts. Agents act to detect host type and install suitable drivers. Still other embodiments contemplate computing systems and computer program products, to name a few.

BACKGROUND OF THE INVENTION

"Cloud computing" is fast becoming a viable computing model for both small and large enterprises. The "cloud" typifies a computing style in which dynamically scalable and often virtualized resources are provided as a service over the Internet. The term itself is a metaphor. As is known, the cloud infrastructure permits treating computing resources as utilities automatically provisioned on demand while the cost of service is strictly based on the actual resource consumption. Consumers of the resource also leverage technologies from the cloud that might not otherwise be available to them, in house, absent the cloud environment.

As with any new paradigm, considerable discussion is taking place regarding how best to utilize the environment. As one example, there has been recent interest in leveraging the public/private cloud infrastructure to make portable the workloads of traditional data centers. In such situations, workload migration amongst host computing devices has been viewed as an "off-line" operation. It is traditionally performed very infrequently and several tools have been developed to assist in moving one workload from one host to another. However, clouds and other computing environments are not always consistent in their selection of computing platforms. Not only does this implicate the operating systems and physical hardware from one box to the next, but also the selections of operating systems and hypervisors in virtual environments.

Consider, for instance, a Linux based workload that is hosted on a VmWare based virtualization host. If this workload requires future migration to a Xen based virtualization host, the following represents the baseline set of tasks requiring performance. One, image and configuration information must be transformed from the originating host to the target host. While it is possible that this is only an optional step, this is only available in situations in which the two virtualization hosts under question can support a common or multiple image formats. Two, provision the image for deployment on the target virtualization platform. This involves configuring front-end para-virtualization drivers which customizes the guest image for optimal performance on the target platform. Similarly, workload migration occurs between physical to physical devices, or virtual to physical devices, as well, and various other one-time activities are also required.

Accordingly, a need exists for better managing workload migration in heterogeneous computing environments. Appreciating the commoditization of hypervisors in recent times, the need further contemplates a dynamic scheme for deploying workloads on chosen hosts in a cloud or other data center environment, with the realization that workloads may be re-deployed on vastly different hypervisors compared to prior deployments. Any improvements along such lines should contemplate good engineering practices, such as simplicity, ease of implementation, unobtrusiveness, stability, etc.

SUMMARY OF THE INVENTION

By applying the principles and teachings associated with managing workloads in a computing system environment with heterogeneous host devices, the foregoing and other problems become solved. Broadly, methods and apparatus involve dynamically managing workload migration from a storage computing device to host devices arranged as physical and/or virtual machines, each with their own heterogeneously arranged computing platforms. On the storage device, fully virtualized images are configured with drivers compatible with any of the host devices. They also include an agent that detects a platform type of a specific host device upon deployment. If the specific host is a physical platform type, the agent provisions native drivers. If the specific host is a virtual platform type, the agent also detects a hypervisor. The agent then provisions front-end drivers that are most compatible with the detected hypervisor. Upon decommissioning of the image, the image is returned to its pristine state and saved for later re-use. Detection methods of the agent are also disclosed as are computing systems and data centers, to name a few.

Executable instructions loaded on one or more computing devices for undertaking the foregoing are also contemplated as are computer program products available as a download or on a computer readable medium. The computer program products are available for installation on a network appliance or an individual computing device.

Certain advantages realized include, but are not limited to: supporting dynamic migration of workloads amongst heterogeneous virtualization hosts; supporting portable workloads with just-in-time image provisioning for optimal performance; and improving resource utilization in the data center or other environment.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for managing workloads in a computing environment with heterogeneous hosts.

Figure 1:
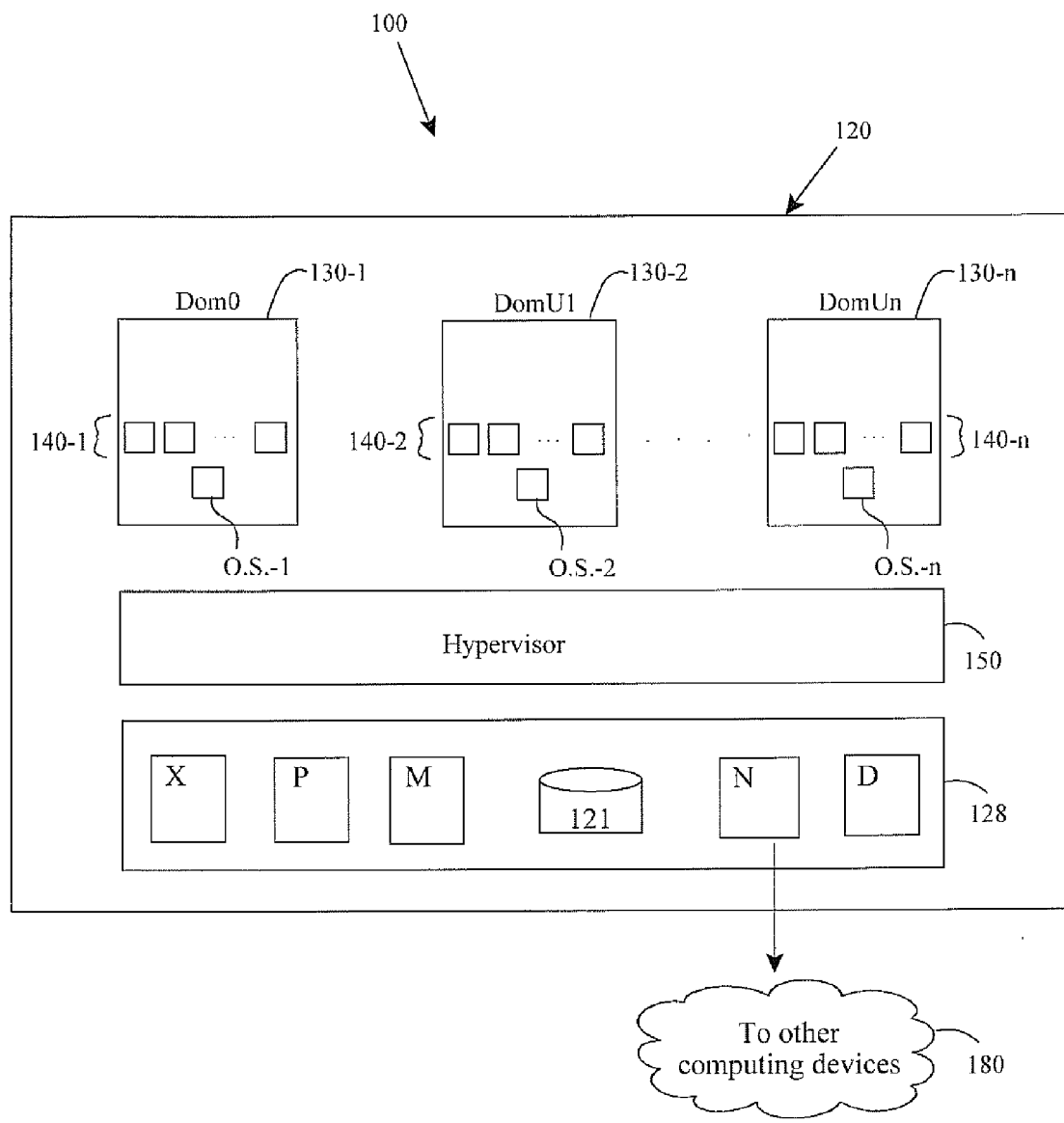
FIG. 1 is a diagrammatic view in accordance with the present invention of a basic computing device for hosting workloads.

With reference to FIG. 1, a computing system environment 100 includes a computing device 120. Representatively, the device is a general or special purpose computer, a phone, a PDA, a server, a laptop, etc., having a hardware platform 128. The hardware platform includes physical I/O and platform devices, memory (M), processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-n (domain Un), each potentially having its own guest operating system (O.S.) (e.g., Linux, Windows, Netware, Unix, etc.), applications 140-1, 140-2, . . . 140-n, file systems, etc. The workloads of each virtual machine also consume data stored on one or more disks 121.

An intervening Xen, Hyper V, KVM, VmWare or other hypervisor 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform.

In use, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
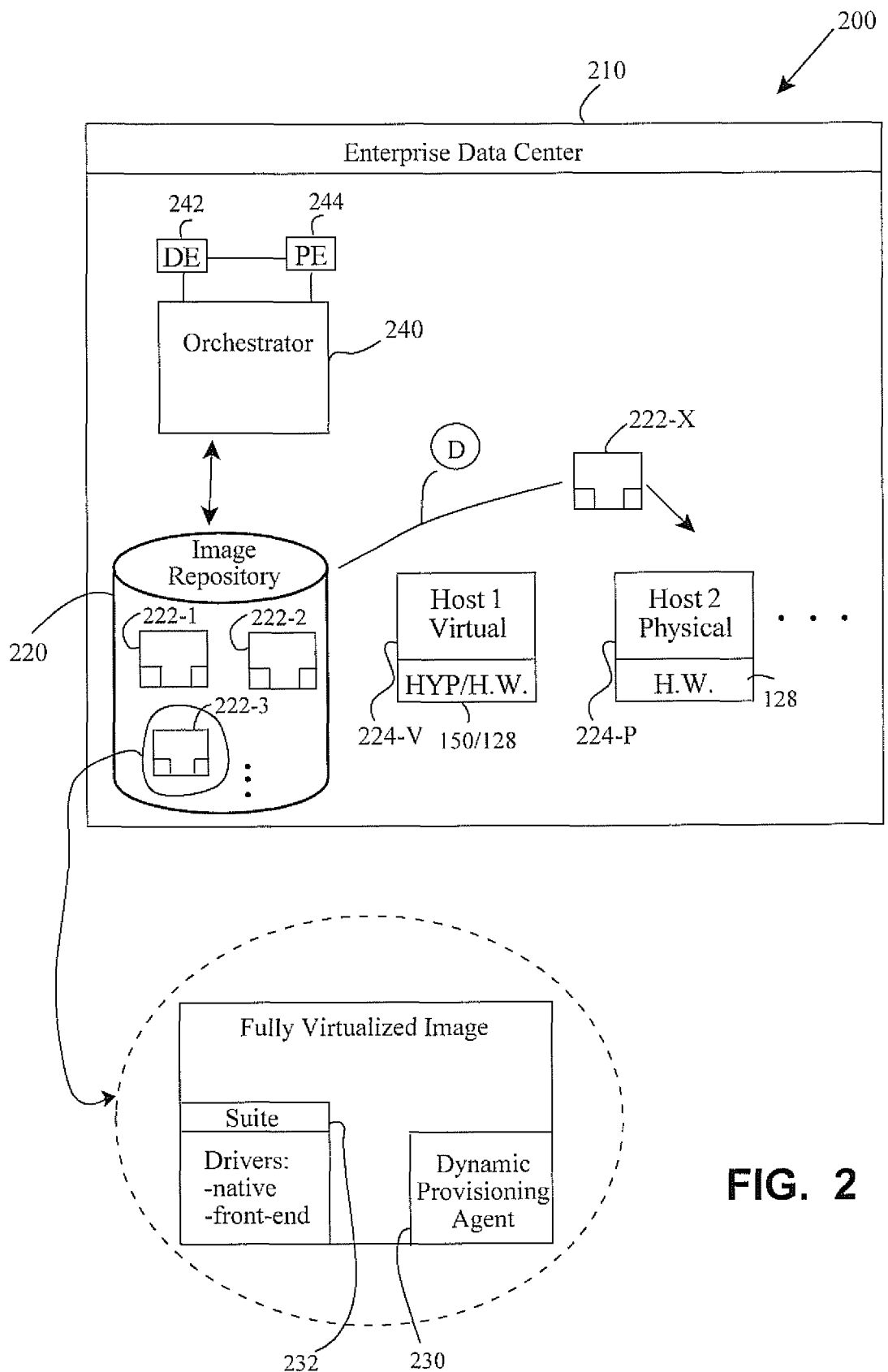
FIG. 2 is a diagrammatic view in accordance with the present invention for managing workload migration amongst heterogeneous host devices in a computing environment.
Figure 3:
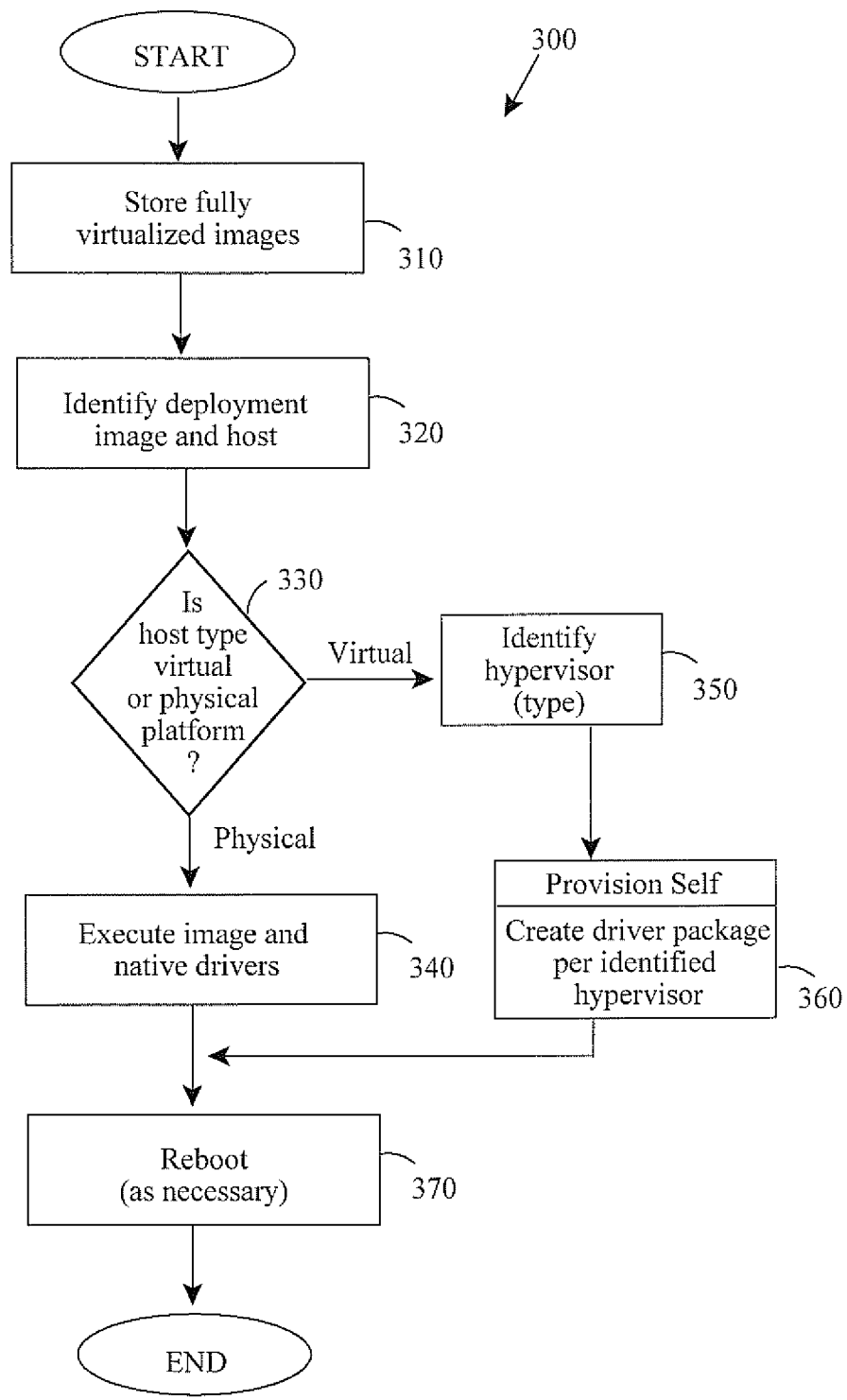
FIG. 3 is a flow chart in accordance with the present invention for representatively managing workload migration amongst heterogenous host devices.

Leveraging the foregoing, FIGS. 2 and 3 show a combined diagram 200 and flow 300 for migrating workloads in an environment of heterogeneous hosts. A data center 210 for an enterprise or other entity includes a storage computing device 220. On it, a plurality of fully virtualized workload images 222-1, 222-2, 222-3, etc. are stored. As compared to a para-virtualized image, a fully virtualized image is stored in a manner giving no indications to the image on what type of computing platform 224-P, 224-V (physical or virtual machine) it will be hosted and executed. A para-virtualized image, on the other hand, includes indications of its host platform, such as integrated drivers that are specific to the host. As used in this context, hosts are arranged heterogeneously in comparison to one another in the environment 200. They may include vastly different hardware platforms 128, different hypervisors 150 (if on a virtual machine 224-V), such as hypervisors known as KVM, VmWare, Xen, HyperV, etc., and/or different operating systems. Alternatively, the hosts may be similar to one another in some regards, such as having a same hardware platform 128, but different in other regards, such as having different hypervisors. Of course, other indicia of a heterogenous environment are possible.

Also, each fully virtualized image includes an embedded agent 230, such as a dynamic provisioning agent (DPA), that will assist in determining the host's type upon deployment to a specific host (action arrow D). In addition, the DPA will find utility in provisioning the image with an appropriate set of drivers upon determining the platform type of the host and/or hypervisor type (of a virtual machine platform). The drivers are obtained from the fully virtualized image as stored, such as in a suite 232 that contains viable drivers commonly compatible with the platform types of hosts. These include, but are not limited to, native drivers, front-end drivers, or other.

During use, the fully virtualized images 222 are stored on the storage device 220, step 310. At step 320, a particular host computing device 224 is identified for deploying an image 222-x. To accomplish this, the environment 200 further includes an orchestrator 240. It works in conjunction with a deployment engine (DE) 242 and/or a policy engine (PE) 244. The policy engine defines criteria regarding how, where, under what circumstances, etc., an image may be available for deployment. The computing policy can be established at an enterprise level, division level, individual level, etc. In addition, it can include setting forth situations in which migration is optional or required. Further still, policies may specify when and how long workload migration lasts. This can include establishing the time for migrating, setting forth an expiration or renewal date, or the like. Policies may also include defining a quality of service for either the data or workloads and hardware platform requirements, such as device type, speed, storage, etc. In any situation, when the policies are eventually met, (e.g., image 222-2 is to be deployed on machine 222-P in a data center 210 such that a correct subnet is obtained), the deployment engine 242 facilitates the transfer of the correct image to the correct machine. Functionally, the orchestrator provides the requisite coordination between these engines, machines and the storage facilities in the environment. It is said to manage the available hardware resources to optimally host the available workload.

In comparison to the past, workloads used to be statically bound to a specific virtualization technology, e.g., a workload bound to a VmWare platform was only hosted on appropriate VmWare platforms. Clearly, this constraint, while easy to meet, results in sub-optimal deployment decisions. In turn, consider the situation in which a subset of host devices are very lightly loaded while others are heavily loaded. If the invention were limited to past technology, the load could not be distributed across all the hosts in a heterogeneous environment and sub-optimal deployment decisions would result.

As seen below, however, features allow for "just in time" provisioning of an image that allows the orchestrator 240 full flexibility in treating all the hosts 224 as "equivalent" in making deployment decisions. Among other things, this improves resource utilization in a heterogeneous data center.

At step 330, a platform type of the host is determined. In this regard, the DPA 230 determines whether the host is a physical or virtual machine. The DPA is configured to undertake this during an early boot sequence by executing a "cpuid" instruction. If such reveals that the host is a physical machine, the image is executed at step 340 and native drivers from the suite of drivers are provisioned. This then runs a workload on a physical box as is typical.

On the other hand, if such reveals that the host is a virtual machine, the "cpuid" instruction will also reveal an identity of the hypervisor, step 350. As is known, hypervisors of commercial interest today have implemented a synthetic CPUID leaf that can be queried to perform hypervisor detection.

At step 360, once the host and hypervisor is known, the DPA creates an appropriate driver package that is compatible with the identification. In one embodiment, this includes the DPA building an appropriate initrd that provisions an image under consideration with the necessary front-end PV drivers for the platform on which the image is being hosted. The appropriate drivers are selected from the image's suite of embedded drivers.

The DPA reboots the guest at step 370. When the guest reboots, the guest has been provisioned for the virtualization host on which it is being hosted and optimal I/O performance results. Also, this guest can now be live migrated, if the need arises amongst compatible hosts. (This assumes, however, compatibility both in the hypervisor and instruction set architecture for the two hosts involved in the migration.) To the extent there is a need to migrate this guest to an incompatible host; this will not occur as a live migration. In such situations, the workload would be decommissioned and hosted on the chosen host. To support this option, the image is reverted to its pristine state when a workload is brought down.

In an alternate embodiment, features of the invention can be extended to accommodate para-virtualized or "enlightened" guests in addition to fully virtualized guests. In this situation, the DPA will further select an appropriate kernel for an image in addition to provisioning the front-end drivers. This kernel selection will occur as part of the dynamic image provisioning step.

Figure 4:
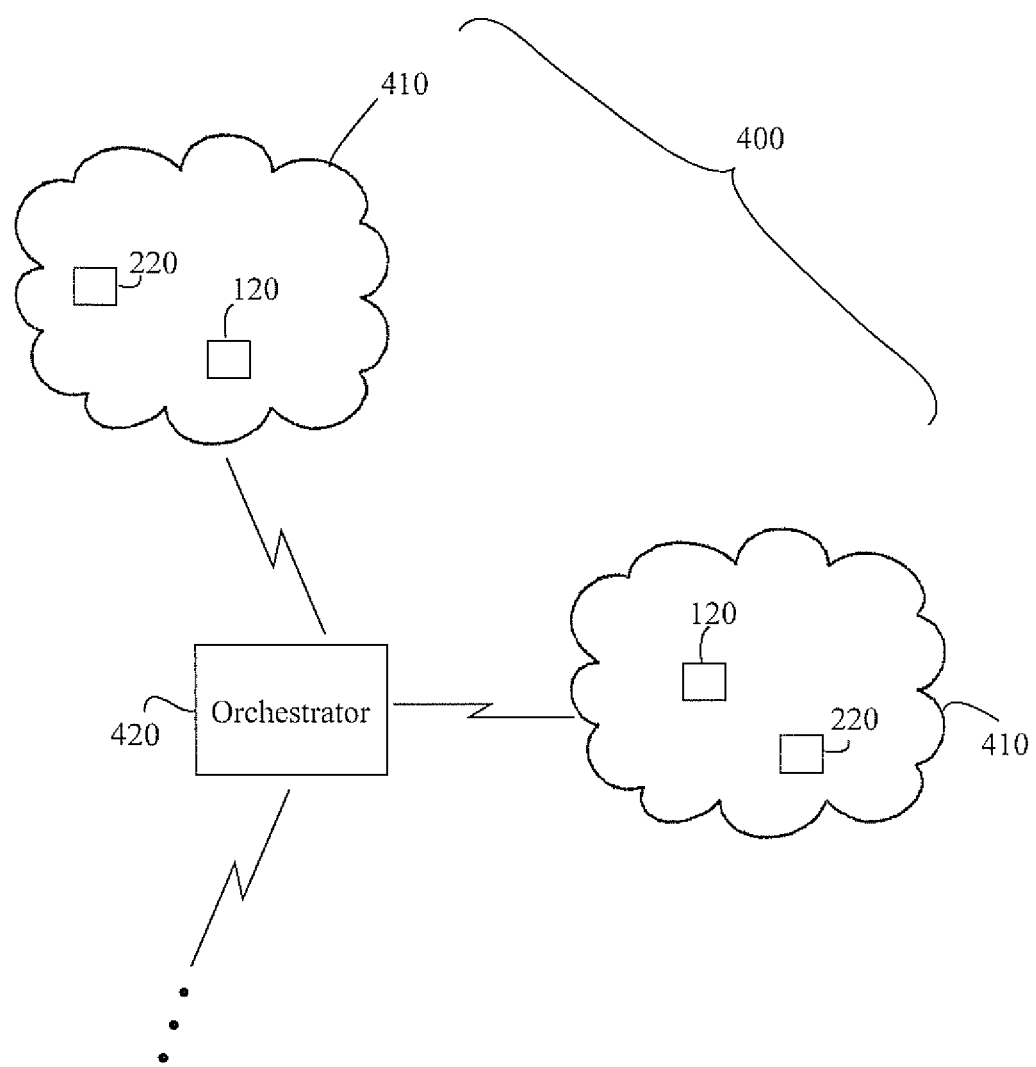
FIG. 4 is a diagrammatic view in accordance with the present invention of a computing environment for workloads.

With reference to FIG. 4, the features of the invention can be replicated many times over in a larger computing environment 400, such as a "cloud" environment or a large enterprise environment. For instance, multiple data centers 410 could exist that are each connected by way of a common orchestrator 440. In turn, each data center could include individual orchestrators 220 for migration of workloads to individual computing devices 120. In turn, the computing policies could be centrally managed and could further include scaling to account for competing interests between the individual data centers. Other policies could also exist that harmonize the events of the data centers. Alternatively still, each data center could avoid having its own orchestrator 220 with each relying on the common orchestrator and a common image repository. Nested hierarchies of all are further embodiments.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of managing workload migration to at least one host of a plurality of heterogeneous host devices having computing platforms, the method comprising:

configuring a fully virtualized workload image for storage on a storage computing device, the fully virtualized image including a plurality of drivers compatible with each of the plurality of heterogeneous host devices and an embedded agent configured to detect a platform type of the at least one host upon deployment thereto, the step of detecting including determining whether the at least one host platform type is a physical or virtual machine; and after said step of detecting, by the embedded agent, provisioning the fully virtualized workload image with one of the plurality of drivers that is most compatible with the detected platform type of the at least one host;

wherein configuring the fully virtualized workload image further includes configuring the embedded agent for querying a synthetic cpuid leaf to detect a hypervisor type if the platform type is a virtual machine; and wherein the stored fully virtualized workload image includes front-end and native drivers of the plurality of drivers that are configured to be provisioned when the embedded agent detects the platform type of the at least one host as a virtual or a physical machine, respectively.

2. The method of claim 1, wherein the configuring the fully virtualized workload image to detect the platform type further includes configuring the embedded agent that can execute a cpuid instruction.

3. The method of claim 1, wherein the provisioning the fully virtualized workload image with said one of the drivers that is most compatible with the detected platform type further includes configuring necessary front-end drivers.

4. The method of claim 1, further including restoring the provisioned fully virtualized workload image to a pristine state upon decommissioning from said deployment.

5. The method of claim 1, further including rebooting the computing platform of the at least one host upon which the fully virtualized workload image is said provisioned upon the deployment.

6. In a computing system environment, a method of managing workload migration to host devices in a data center having heterogeneously arranged computing platforms, the method comprising:

configuring a storage computing device with a plurality of fully virtualized workload images, each of the fully virtualized workload images including a plurality of drivers compatible with pluralities of said host devices and an embedded agent configured to detect a platform type of a specific host device of the pluralities of said host devices upon deployment of one image of the plurality of fully virtualized workload images thereto;

by the embedded agent of the deployed one image of the plurality of fully virtualized workload images, detecting a platform type of a specific host device of the pluralities of said host devices, including determining whether the specific host device is a physical or a virtual machine; and provisioning the deployed one image with at least one driver of the plurality of drivers that is most compatible with the detected platform type;

wherein configuring the storage computing device includes providing the plurality of fully virtualized workload images with front-end and native drivers of the plurality of drivers that are configured to be provisioned when the embedded agent detects the platform type of the specific host device as a virtual or a physical device, respectively; and wherein the embedded agent is configured to query a synthetic cpuid leaf to detect a hypervisor type if the specific host device is a virtual machine.

7. The method of claim 6, wherein the provisioning the deployed one image with said at least one driver further includes provisioning a front-end driver if the detected platform type is a virtual machine.

8. The method of claim 6, wherein the provisioning the deployed one image with said at least one driver further includes provisioning a native driver if the detected platform type is a physical machine.

9. The method of claim 6, further including restoring the deployed one image to a pristine state on the storage computing device upon decommissioning from said deployment to the specific host device.

10. The method of claim 6, further including rebooting the specific host device upon the deployment.

11. A computing system to manage workload migration to host devices in a data center having heterogeneously arranged computing platforms, the computing system comprising:

a processor;

a storage computing device storing pluralities of fully virtualized workload images, each of the stored fully virtualized workload images including a plurality of drivers compatible with pluralities of said host devices and an embedded agent configured to determine a platform type of a specific said host device upon deployment thereto, further wherein the embedded agent determines whether said specific host device is a virtual or a physical machine;

at least first and second virtual and/or physical computing devices having a hardware platform with a processor and memory upon which a plurality of workloads can be configured, the virtual computing devices further having a hypervisor; and an orchestrator configured to identify which of the stored fully virtualized workload images are to be deployed to one or both of the first and second virtual and/or physical computing devices;

wherein the pluralities of fully virtualized workload images of the storage computing device include front-end and native drivers of the plurality of drivers that are configured to be provisioned when the embedded agent detects the platform type of the specific said host device as a virtual or a physical platform, respectively; and wherein the embedded agent is configured for querying a cpuid leaf to detect a hypervisor type if the platform type is a virtual machine.

12. The computing system of claim 11, wherein the embedded agent of said each of the stored fully virtualized workload images is configured to dynamically provision a respective said fully virtualized workload image with at least one driver of the plurality of drivers that is most compatible with the detected platform type.

* * * * *